United States Patent
Jang et al.

(10) Patent No.: US 11,848,452 B2
(45) Date of Patent: *Dec. 19, 2023

(54) TERNARY ALLOY CATALYST AND METHOD FOR PREPARING THE SAME

(71) Applicants: Hyundai Motor Company, Seoul (KR); Kia Corporation, Seoul (KR)

(72) Inventors: Ji-Hoon Jang, Gyeonggi-do (KR); Jee Youn Hwang, Seoul (KR); Eunjik Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 261 days.

This patent is subject to a terminal disclaimer.

(21) Appl. No.: 17/391,643

(22) Filed: Aug. 2, 2021

(65) Prior Publication Data
US 2022/0223881 A1    Jul. 14, 2022

(30) Foreign Application Priority Data
Jan. 8, 2021   (KR) .......................... 10-2021-0002306

(51) Int. Cl.
*H01M 4/88*   (2006.01)
*H01M 4/92*   (2006.01)
*B01J 37/34*  (2006.01)
*H01M 4/86*   (2006.01)

(52) U.S. Cl.
CPC ......... *H01M 4/921* (2013.01); *H01M 4/8657* (2013.01); *H01M 4/926* (2013.01)

(58) Field of Classification Search
None
See application file for complete search history.

(56) References Cited

U.S. PATENT DOCUMENTS

| | | | |
|---|---|---|---|
| 2017/0120222 A1* | 5/2017 | Kim | B01J 37/04 |
| 2020/0067105 A1* | 2/2020 | You | H01M 4/923 |
| 2021/0167400 A1* | 6/2021 | Yamasaki | H01M 4/926 |
| 2022/0209248 A1* | 6/2022 | Hwang | H01M 8/1018 |
| 2022/0219158 A1* | 7/2022 | Jang | B01J 37/343 |
| 2022/0231306 A1* | 7/2022 | Oh | H01M 4/921 |

* cited by examiner

*Primary Examiner* — Tracy M Dove
(74) *Attorney, Agent, or Firm* — Fox Rothschild LLP

(57) ABSTRACT

Provided is a method of preparing a ternary alloy catalyst that includes irradiating ultrasonic waves to a precursor admixture including a precursor of a noble metal, a precursor of a first transition metal, a precursor of a second transition metal, and a carrier. Particularly, the precursor of the second transition metal is an acetate-based precursor.

15 Claims, 10 Drawing Sheets

TERNARY ALLOY CATALYST AND METHOD FOR PREPARING THE SAME

CROSS-REFERENCE TO RELATED APPLICATION

This application claims priority to and the benefit of Korean Patent Application No. 10-2021-0002306 filed in the Korean Intellectual Property Office on Jan. 8, 2021, the entire contents of which are incorporated herein by reference.

TECHNICAL FIELD

The present invention relates to a ternary alloy catalyst for a fuel cell and a method for preparing the same.

BACKGROUND

A fuel cell is an energy conversion device that directly converts chemical energy of a fuel into electrical energy. Because the fuel cell has superior efficiency compared with existing internal combustion engines, it has been spotlighted as a next-generation energy source due to its high energy density and environment-friendliness.

Polyelectrolyte fuel cells (PEMFC) and direct methanol fuel cells (DMFC) mainly operate at a low temperature of less than or equal to about 80° C., and thus an electrode catalyst is required to increase rates of oxidation and reduction reactions of the fuel cell. In particular, platinum has been mainly used as an electrode catalyst for a fuel cell because it is the only catalyst capable of promoting oxidation of fuel (hydrogen or alcohol) and reduction of oxygen from room temperature to around 100° C. However, since platinum reserves are limited and very expensive, it is very important to reduce the amount of platinum used or maximize catalytic activity per unit mass for commercialization of fuel cells.

In order to achieve the above object, studies on platinum alloy catalysts have been conducted. For example, platinum alloy catalysts theoretically have greater activity and stability than pure platinum catalysts due to electrical and structural characteristics of the particle surface, and thus are attracting attention as a reliable alternative to fuel cell electrode materials.

However, the platinum alloy catalysts have a problem of deteriorating durability along with catalytic activity, because a significant amount of transition metals not forming an alloy are present on the particle surfaces and easily diluted during a process of preparing catalyst slurry with less than or equal to pH 1 and under an acidic operating condition of fuel cells.

SUMMARY

In one preferred aspect, provided is a method of preparing a ternary alloy catalyst capable of improving durability along with catalytic activity by preventing the phase separation of alloy-forming particles as well as improving the elution phenomenon of metal components in the alloy catalyst.

In one preferred aspect, provided is a ternary alloy catalyst prepared by using a method for preparing a ternary alloy catalyst.

In one aspect, a method of preparing a ternary alloy catalyst is provided, comprising treating a precursor admixture comprising a precursor of a noble metal, a precursor of a first transition metal and a precursor of a second transition metal, wherein the precursor of the second transition metal is an acetate-based precursor. The precursor admixture may suitably further comprises a carrier. In certain embodiments, the precursor admixture is treated with ultrasonic waves.

In an aspect, provided is a method of preparing a ternary alloy catalyst. The method may include irradiating ultrasonic waves to a precursor admixture including a precursor of a noble metal, a precursor of a first transition metal, a precursor of a second transition metal, and a carrier. Particularly, the precursor of the second transition metal may be an acetate-based precursor.

The noble metal may include one or more selected from the group consisting of platinum (Pt), ruthenium (Ru), osmium (Os), iridium (Ir), palladium (Pd), and an alloy thereof.

The precursor of the noble metal may include one or more selected from the group consisting of a nitrate, a sulfate, an acetate, a chloride, an oxide, and an acetylacetonate of the noble metal.

The first transition metal and the second transition metal may be different transition metals.

The first transition metal or the second transition metal may include one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), lanthanum (La), and an alloy thereof.

The precursor of the first transition metal may include one or more selected from the group consisting of a nitrate, a sulfate, an acetate, a chloride, an oxide, and an acetylacetonate of the first transition metal.

The carrier may include one or more selected from the group consisting of carbon black, graphite, carbon nanofiber, graphitized carbon nanofiber, carbon nanotube, carbon nanohorn, and carbon nanowire.

In the irradiating of ultrasonic waves, core-shell particles including a transition metal oxide coating layer may be formed.

The core-shell particles may include a transition metal core including a first transition metal and a second transition metal, a shell surrounding the transition metal core and including a noble metal, and a transition metal oxide coating layer surrounding the shell and including an oxide of a first transition metal and an oxide of a second transition metal.

A thickness of the transition metal oxide coating layer may be about 0.2 nm to about 0.88 nm.

The irradiating of the ultrasonic waves may be performed for about 2 hours to about 6 hours at an output of about 100 W to about 300 W based on 100 mL of the precursor admixture.

The method of preparing the ternary alloy catalyst may further include annealing core-shell particles to form alloy particles including a transition metal oxide coating layer, and removing the transition metal oxide coating layer from the alloy particles.

Each of the alloy particles may include an alloy core including an alloy of a first transition metal and a second transition metal, and a noble metal skin layer surrounding the alloy core and including a noble metal.

The annealing may be performed at a temperature of about 200° C. to about 400° C. for about 0.5 hours to about 16 hours.

The removing of the transition metal oxide coating layer from the alloy particles may be performed by acid treatment.

In an aspect, provided is a ternary alloy catalyst includes an alloy core including an alloy of a first transition metal and a second transition metal, and a noble metal skin layer including a noble metal surrounding the alloy core.

In the ternary alloy catalyst, an atomic ratio of the noble metal, the first transition metal, and the second transition metal may be about 1:0.8 to 0.2:0.2 to 0.8.

The methods of preparing the ternary alloy catalyst according to various exemplary embodiments may improve the durability along with the catalytic activity by preventing the phase-separation of alloy-forming particles as well as improving the elution phenomenon of metal components in the alloy catalyst.

Other aspects of the invention are disclosed infra.

DETAILED DESCRIPTION

The advantages and features of the present disclosure and the methods for accomplishing the same will be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined. In addition, unless explicitly described to the contrary, the word "comprise," and variations such as "comprises" or "comprising," will be understood to imply the inclusion of stated elements but not the exclusion of any other elements.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

Further, the singular includes the plural unless mentioned otherwise.

A method of preparing a ternary alloy catalyst includes irradiating ultrasonic waves to a precursor admixture including a precursor of a noble metal, a precursor of a first transition metal, a precursor of a second transition metal, and a carrier.

Figure 1:
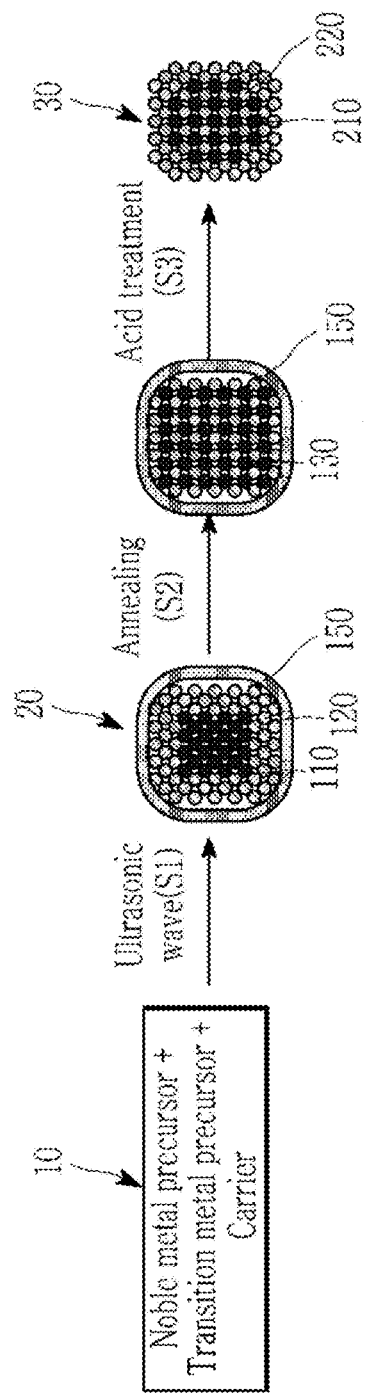
FIG. 1 shows an exemplary method of preparing a ternary alloy catalyst according to an exemplary embodiment of the present invention.

FIG. 1 is a schematic view showing the method of preparing a ternary alloy catalyst according to an embodiment. For example, the method of preparing a ternary alloy catalyst is described.

When ultrasonic waves are irradiated to the precursor admixture 10 including a precursor of a noble metal, a precursor of a first transition metal, a precursor of a second transition metal, and a carrier, core-shell particles 20 including the transition metal oxide coating layer 150 may be formed (S1).

High frequency oscillation of the ultrasonic waves generates bubbles in a cavity, resulting in oscillatory growth, and when the oscillation finally reaches a certain scale, the cavity may explode. This series of processes caused by the ultrasonic irradiation is called to be "an acoustics cavitation mechanism."

The cavity explosion occurring in the final stage of the acoustics cavitation mechanism may cause a huge amount of thermal energy up to about 5000 K, which is dissipated in a very short time of about $10^{-6}$ seconds.

When reactants in the chemical reaction combined with ultrasonic irradiation are at least two materials having different vapor pressures, the at least two reactants may have different evaporation rates to bubbles by a high frequency oscillation of ultrasonic waves, so that structural and electrochemical characteristics of the reaction resultants may be controlled using the same. For example, when nanoparticles including at least two metals are prepared by using a noble metal precursor and a transition metal precursor as reactants and irradiating the same with ultrasonic waves, distributions of the noble metal and the transition metal elements in nanoparticles may be controlled according to a vapor pressure difference of the noble metal precursor and the transition metal precursor.

For example, in the nanoparticles, the noble metal having a low vapor pressure may be disposed in shell portions, and the transition metal having a high vapor pressure may be disposed in core portions, forming core-shell particles 20.

The irradiating of ultrasonic waves may be performed for about 2 hours to about 6 hours at an output of about 100 W to about 300 W based on about 100 mL of the precursor admixture 10. When the irradiating of ultrasonic waves is performed at an output of less than about 100 W or for less than about 2 hours, metal ions may be insufficiently reduced, but when at an output of greater than about 300 W or for greater than about 6 hours, the particles may grow into an unnecessary size.

The irradiating of ultrasonic waves may be performed at a temperature of about 130° C. to about 180° C. When the irradiating of ultrasonic waves is performed at less than about 130° C., the metal ions may be insufficiently reduced, but when at greater than about 180° C., the particles may grow into an unnecessary size.

The noble metal may include one or more selected from the group consisting of platinum (Pt), ruthenium (Ru), osmium (Os), iridium (Ir), palladium (Pd), and an alloy thereof. The precursor of the noble metal may have a lower vapor pressure than that of the transition metal precursor, and may contribute to a galvanic substitution reaction after formation of transition metal seed particles and increase of the sizes. For example, the precursor of the noble metal may be in a form of salts of the noble metal, and may include a nitrate, a sulfate, an acetate, a chloride, an oxide, or a combination thereof. Particularly, the noble metal precursor may include an acetyl acetonate of the noble metal, a hexafluoroacetyl acetonate of the noble metal, or a pentafluoroacetyl acetonate of the noble metal.

The transition metal includes a first transition metal and a second transition metal, and the first transition metal and the second transition metal may be different transition metals.

The first transition metal or the second transition metal may include one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), lanthanum (La), and an alloy thereof.

Meanwhile, the second transition metal may be a transition metal capable of improving an elution phenomenon of the first transition metal. In other words, when the alloy catalyst includes the noble metal and the first transition metal alone, the first transition metal may be easily eluted during a process of preparing catalyst slurry with pH 1 or less or under an acidic operating condition of a fuel cell and thus deteriorate durability along with catalytic activity. To the contrary, when the second transition metal is further included, the elution phenomenon of the first transition metal may be improved.

For example, the first transition metal may include one or more selected from the group consisting of iron (Fe), cobalt (Co), nickel (Ni), manganese (Mn), chromium (Cr), and an alloy thereof, and the second transition metal may include one or more selected from the group consisting of copper (Cu), zinc (Zn), yttrium (Y), lanthanum (La), ruthenium (Ru), and an alloy thereof. In particular, the first transition metal may be iron (Fe) and the second transition metal may be copper (Cu).

The precursor of the first transition metal may be in a form of salts of the first transition metal, and may include, for example, a nitrate, a sulfate, an acetate, a chloride, an oxide, or a combination thereof. Particularly, the precursor of the first transition metal may be an acetyl acetonate of the first transition metal, a hexafluoroacetyl acetonate of the transition metal, or a pentafluoroacetyl acetonate of the first transition metal.

This precursor of the first transition metal may be rapidly volatilized due to the high vapor pressure and trapped in the cavity by the ultrasonic waves, and accordingly, the transition metal may be located in the core portion of the core-shell particles 20.

On the other hand, when the ternary alloy catalyst is prepared through the ultrasonic synthesis by further including the precursor of the second transition metal, the precursor of the second transition metal may be phase-separated, forming non-alloyed second transition metal particles.

In order to solve this problem, the precursor of the second transition metal may be an acetate-based precursor. For example, when the precursor of the second transition metal is sulfate, catalytic activity may be deteriorated by adsorbing and poisoning the sulfate on the surface of catalyst particles due to high adsorption energy of $SO_x$ anions. When the precursor of the second transition metal is chloride, $ClO_x^{y-}$ may be formed during the ultrasonic reaction and thus damage an ultrasonic device, and when the precursor of the second transition metal is nitrate, an alloy formation ratio of the second transition metal may be reduced due to the low dispersion in an organic solvent. On the contrary, when the precursor of the second transition metal is acetate-based, these problems do not occur, but since this precursor has lower reactivity (i.e., volatility) thereof than the other precursors and thus may form a ternary alloy without the phase-separation.

The carrier may include one or more selected from the group consisting of a carbon carrier, for example, carbon black, graphite, carbon nanofiber, graphitized carbon nanofiber, carbon nanotube, carbon nanohorn, carbon nanowire, or a combination thereof. The carbon black may include denka black, ketjen black, acetylene black, channel black, furnace black, lamp black, and thermal black.

The precursor admixture 10 may further include a reducing solvent.

The reducing solvent may be an organic material having no moisture or oxygen source, for example, a solvent having a reducing power at a temperature of greater than or equal to about 70° C. or a solvent having a reducing power at a temperature of about 70° C. to about 400° C. Particularly, the reducing solvent may include one or more selected from the group consisting of ethylene glycol, di-ethylene glycol, tri-ethylene glycol, poly-ethylene glycol, and glycerol.

The reducing solvent may be one of reactants of a noble metal precursor and a transition metal precursor in a cavity formed by the ultrasonic treatment, and also, maintaining a high boiling point to create an external liquid environment for generating and extinguishing a cavity.

Meanwhile, on the surface of the core-shell particles 20 formed through the ultrasonic treatment, the transition metal oxide coating layer 150 surrounding the noble metal shell 120 may be included.

The transition metal oxide coating layer 150 may be formed due to insufficient solubility of the transition metals into a platinum lattice, a difference of the reduction rates, and a component ratio of an excessive transition metal during the ultrasonic treatment.

A thickness of the transition metal oxide coating layer 150 may be about 0.2 nm to about 0.88 nm. When the thickness of the transition metal oxide coating layer 150 is less than about 0.2 nm, the transition metal oxide coating layer 150 may be formed in a non-uniform and thin thickness, and thereby, a particle size may not be well controlled, while when the thickness of the transition metal oxide coating layer 150 is greater than about 0.88 nm, a crystalline transition metal oxide may be produced after the annealing process, leaving a residue.

Since the transition metal oxide coating layer 150 is derived from the transition metal precursor like transition metal core 110, the transition metal core 110 may include the first transition metal and the second transition metal, and the transition metal oxide coating layer 150 may include oxides of the first and second transition metals, and accordingly, the transition metal oxide coating layer 150 and the transition metal core 110 may include the same transition metal.

The method of preparing the ternary alloy catalyst 30 according to various exemplary embodiments of the present invention may simplify a process and reduce a cost by forming the core-shell particles 20 including the transition metal oxide coating layer 150 as one process through the ultrasonic treatment.

The method of preparing the ternary alloy catalyst 30 may further include annealing the core-shell particles 20 (S2), and removing the transition metal oxide coating layer 150 (S3).

In the annealing of the core-shell particles 20 (S2), the alloy particles 130 including the transition metal oxide coating layer 150 are formed.

Particularly, through the annealing process, the alloy particles 130 including an alloy core including an alloy of a first transition metal and a second transition metal, and a noble metal skin layer including a noble metal surrounding the alloy core is formed.

Herein, since the transition metal oxide coating layer 150 suppresses growth of the particles and thus controls the alloy particles 130 to have a size of several nanometers during the annealing process, a high temperature annealing process may be sufficiently performed to regularly arrange metal atoms in the alloy and thus increase composition uniformity and catalytic activity.

The annealing may be performed at a temperature of about 200° C. to about 400° C. When the annealing temperature is less than 200° C., an increase in catalytic activity may be limited due to the lack of improvement in the regular arrangement of metal atoms in the alloy. When the annealing temperature is greater than about 400° C., an effect of inhibiting particle size growth may decrease, resulting in decreased catalytic activity.

The annealing process may be performed in an inert gas atmosphere such as argon, nitrogen, or a mixed gas atmosphere of an inert gas and hydrogen ($H_2$), and an atmosphere including about 4 volume % to about 6 volume % of hydrogen based on a total volume of the mixed gas.

Finally, the removing (S3) of the transition metal oxide coating layer 150 may be performed by acid treatment.

The acid used for the acid treatment may include $HClO_4$, $HNO_3$, HCl, or a combination thereof.

A concentration of the acid may be about 0.01 M to about 1.0 M. When the concentration of the acid is less than about 0.01 M, it may be insufficiently etched, and the acid treatment time may be lengthened, while when the concentration of the acid is greater than about 1.0 M, platinum may be dissolved together.

The acid treatment may be performed at a temperature of about 60° C. to about 94° C. for about 2 hours to about 4 hours. When the acid treatment temperature is less than about 60° C. or the acid treatment time is less than 2 hours, etching may be insufficient. When the acid treatment temperature is greater than about 94° C., a boiling phenomenon in the container may be severe even if refluxed, causing safety problems and when the acid treatment time is greater than about 4 hours, there is no change in the transition metal content, which may waste process time and cost.

A ternary alloy catalyst 30 prepared by the aforementioned method for preparing the ternary alloy catalyst is also provided.

The ternary alloy catalyst 30 includes an alloy core 210 including an alloy of a first transition metal and a second transition metal, and a noble metal skin layer 220 surrounding the alloy core 210 and including a noble metal.

According to the method of preparing the ternary alloy catalyst 30 according to various exemplary embodiments of the present invention, since the core-shell particles 20 formed through the irradiating of ultrasonic waves include the transition metals in the core, the ternary alloy catalyst 30 formed through the annealing thereof has the noble metal skin layer 220 in which the noble metal particles are exposed to the outer surface of the ternary alloy catalyst 30 and dispersed in high density therein.

In general, a slurry preparation process for electrode formation proceeds at a pH of less than or equal to about 1, and since the fuel cell is operated in an acidic atmosphere, the transition metals in the alloy catalyst may be easily eluted, and the eluted transition metals enter the ion exchange membrane to increase the membrane resistance. As a result, deterioration of the fuel cell performance may be caused.

However, since the ternary alloy catalyst 30 prepared by the aforementioned method of preparing the ternary alloy catalyst includes the second transition metal, elution of the first transition metal may be suppressed.

A thickness of the noble metal skin layer 220 may be less than or equal to about 0.5 nm, or may be about 0.2 nm to about 0.5 nm. When the thickness of the noble metal skin layer 220 is greater than about 0.5 nm, it has a surface structure similar to that of the existing platinum catalyst, and thus the effect of improving performance due to alloying may be lost.

In the ternary alloy catalyst 30, the atomic ratio of the noble metal, the first transition metal, and the second transition metal may be about 1:0.8 to 0.2:0.2 to 0.8. When the atomic ratio of the first transition metal is greater than about 0.8, the effect of the second transition metal may be insufficient, while when it is less than about 0.2, separation of the second transition metal may occur.

A particle diameter of the ternary alloy catalyst 30 may be about 2 nm to about 20 nm. When the particle diameter of the ternary alloy catalyst 30 is less than about 2 nm, durability of the catalyst may be deteriorated, while when it is greater than about 20 nm, it may be insufficient to secure an electrochemical specific surface area.

Further provided is an electrode for a fuel cell, including the ternary alloy catalyst 30 and the ionomer mixed with the ternary alloy catalyst 30.

Also provided is a membrane-electrode assembly including an anode and a cathode facing each other, and an ion exchange membrane between the anode and cathode, wherein the anode, the cathode, or both are the aforementioned electrodes.

Moreover, provided is a fuel cell including the aforementioned membrane-electrode assembly.

The electrode, the membrane-electrode assembly, and the fuel cell are the same as those of the general electrode, the membrane-electrode assembly, and the fuel cell, except that the aforementioned ternary alloy catalyst 30 is included, so detailed descriptions thereof will be omitted.

EXAMPLE

Hereinafter, specific examples of the invention are described. However, the examples described below are for illustrative purposes only, and the scope of the invention is not limited thereto.

Preparation Example

Preparation of Ternary Alloy Catalyst

Reference Example 1

Platinum acetylacetonate (or $Pt(acac)_2$), iron acetylacetonate (or $Fe(acac)_3$), and a porous carbon carrier (Vulcan XC72) were added to ethylene glycol to have compositions shown in Table 1 to prepare each precursor admixture, and 100 mL of the precursor admixture was irradiated by using tip-type ultrasonic waves (amplitude 30%, 13 mm solid probe, 20 kHz, Model VC-500 made by Sonic & Materials, Inc.) for 3 hours at an output of 150 W under an argon atmosphere.

Subsequently, the obtained particles were annealed under an $H_2$/Ar mixed gas atmosphere at a temperature of 400° C. for 2 hours to prepare a PtFe/C catalyst.

Examples 1 to 3

Each precursor admixture was prepared by adding Pt(acac)$_2$, Fe(acac)$_3$, copper(II) acetate, and a porous carbon carrier (Vulcan XC72) to ethylene glycol to have compositions shown in Table 1, and 100 mL of each precursor admixture was irradiated by using tip-type ultrasonic waves (amplitude 30%, 13 mm solid probe, 20 kHz, Model VC-500 made by Sonic & Materials, Inc.) under an argon atmosphere at an output of 150 W for 3 hours to form core-shell particles including a transition metal oxide coating layer.

The obtained core-shell particles were annealed under a $H_2$/Ar mixed gas atmosphere at a temperature of 400° C. for 2 hours to form an alloy particle including a transition metal oxide coating layer.

The alloy particles were acid-treated with a mixed solution of 0.1 M $HClO_4$ and ethanol at a temperature of 94° C. for 4 hours to prepare a ternary alloy catalyst.

Comparative Example 1

A ternary alloy catalyst was prepared according to the same method as Example 1 except that copper acetylacetonate (or Cu(acac)$_2$) was used instead of the copper (II) acetate.

TABLE 1

| | Composition | Pt content (mol %) | Fe content (mol %) | Cu content (mol %) | Pt loading (wt %) | Transition metal loading (wt %) |
|---|---|---|---|---|---|---|
| Reference Example 1 | PtFe/C | 1 | 0.21 | — | 27.6 | 29.3 |
| Example 1 | PtFeCu/C-1 | 1 | 0.19 | 0.09 | 26.5 | 28.8 |
| Example 2 | PtFeCu/C-2 | 1 | 0.12 | 0.17 | 26.3 | 28.7 |
| Example 3 | PtFeCu/C-3 | 1 | 0.18 | 0.39 | 23.9 | 28.2 |

Experimental Example 1: XRD and TEM Analyses of Ternary Alloy Catalyst

Figure 2:
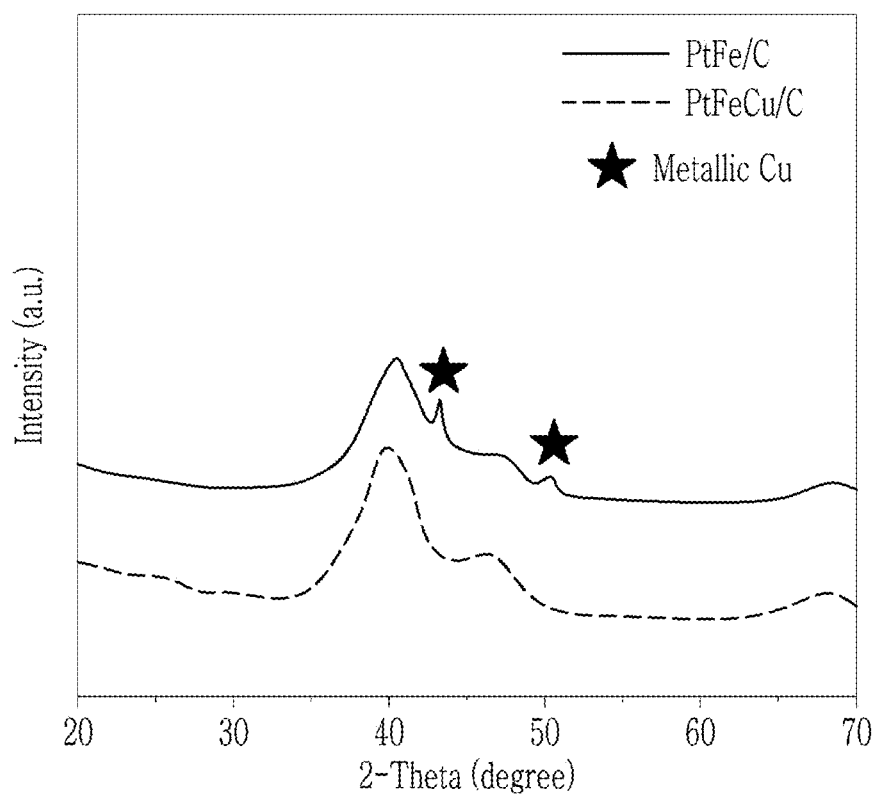
FIG. 2 is a graph showing in-situ XRD analysis results of the binary alloy catalyst prepared in Reference Example 1 and the ternary alloy catalyst prepared in Comparative Example 1.

The binary alloy catalyst prepared in Reference Example 1 (PtFe/C) and the ternary alloy catalyst prepared in Comparative Example 1 (PtFeCu/C) were in-situ XRD analyzed, and the results are shown in FIG. 2.

As shown in FIG. 2, as for the PtFeCu ternary alloy catalyst prepared by using Cu(acac)$_2$, a portion of Cu was phase-separated into metallic Cu.

Figure 3:
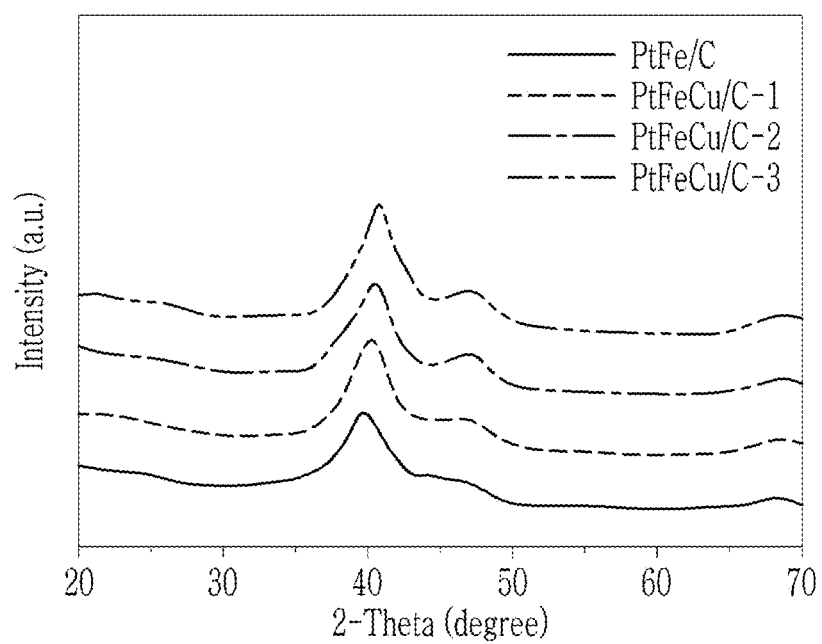
FIG. 3 is a graph showing in-situ XRD analysis results of the binary alloy catalyst prepared in Reference Example 1, and the ternary alloy catalysts prepared in Example 1 to Example 3.

In addition, the binary alloy catalyst of Reference Example 1 (PtFe/C) and the ternary alloy catalysts of Examples 1 to 3 (PtFeCu/C-1 to PtFeCu/C-3) were in-situ XRD analyzed, and the results are shown in FIG. 3. The ternary alloy catalysts prepared in Examples 1 to 3 exhibited no metallic Cu and thus had no Cu phase-separation.

Figure 4:
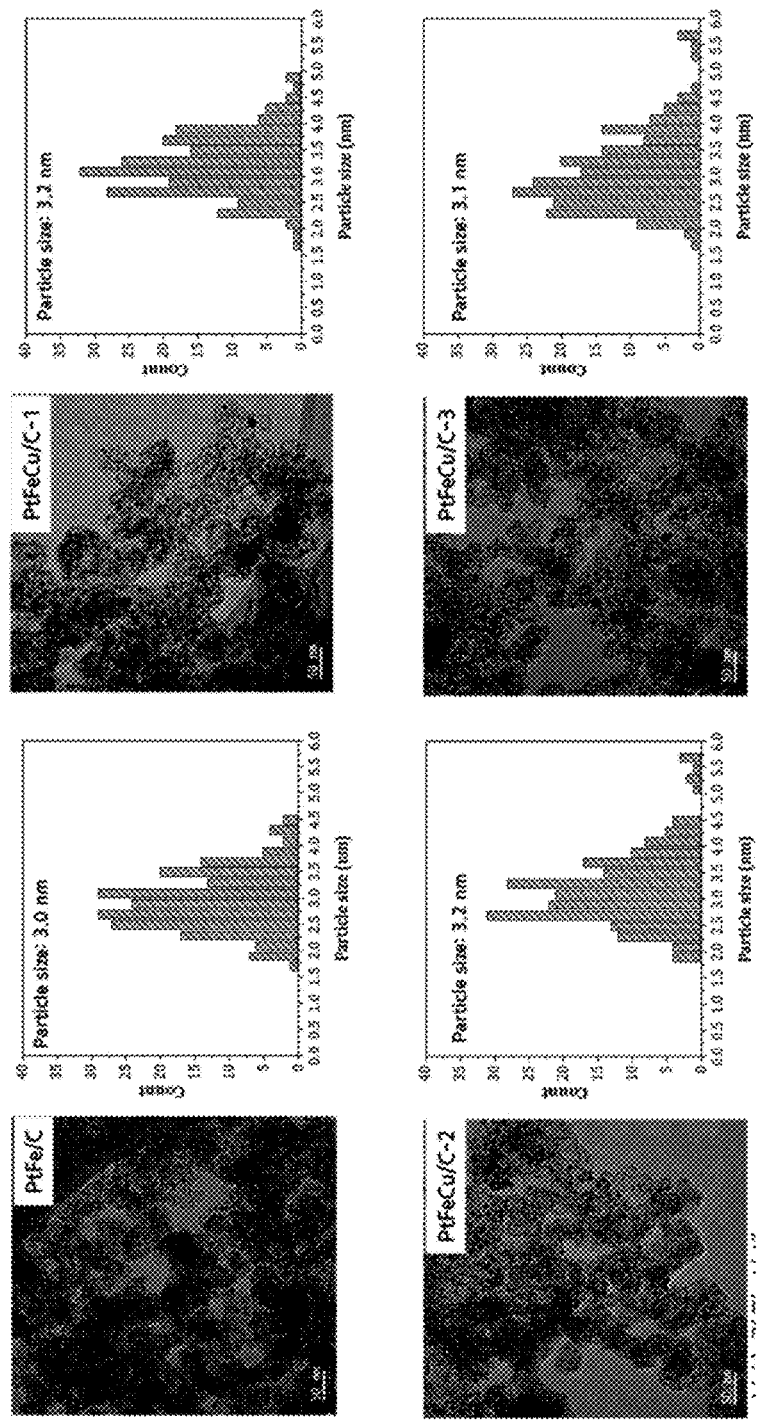
FIG. 4 is photographs of the binary alloy catalyst prepared in Reference Example 1, and the ternary alloy catalysts prepared in Example 1 to Example 3 observed with a transmission electron microscope (TEM).

In addition, the binary alloy catalyst of Reference Example 1 (PtFe/C) and the ternary alloy catalysts of Examples 1 to 3 (PtFeCu/C-1 to PtFeCu/C-3) were examined with a transmission electron microscope (TEM), and the results are shown in FIG. 4. The binary alloy catalyst of Reference Example 1 (PtFe/C) and the ternary alloy catalysts of Examples 1 to 3 (PtFeCu/C-1 to PtFeCu/C-3) all had a size of about 3 nm regardless of the compositions and were well dispersed on a carbon support.

Figure 5:
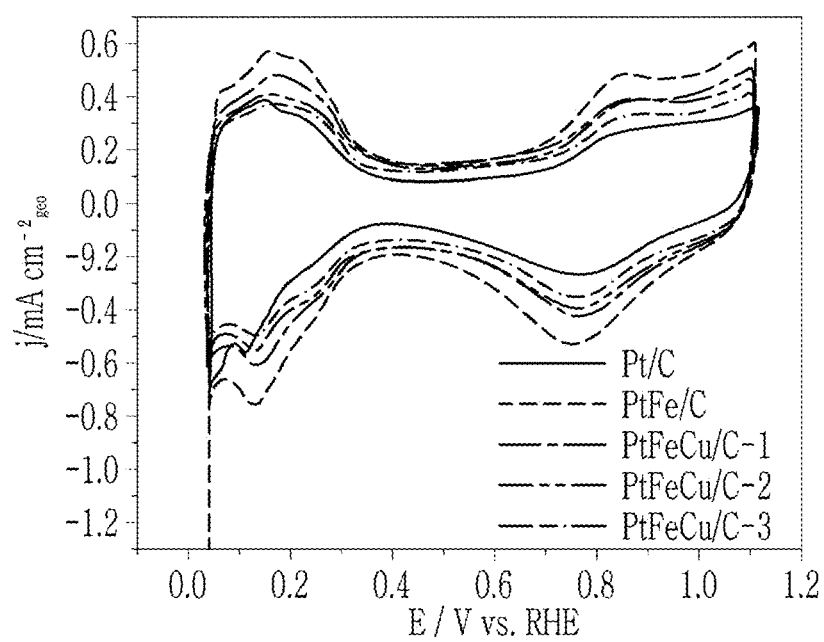
FIGS. 5 and 6 are graphs showing the results of measuring the performance of the binary alloy catalyst prepared in Reference Example 1, and the ternary alloy catalysts prepared in Example 1 to Example 3.
Figure 6:
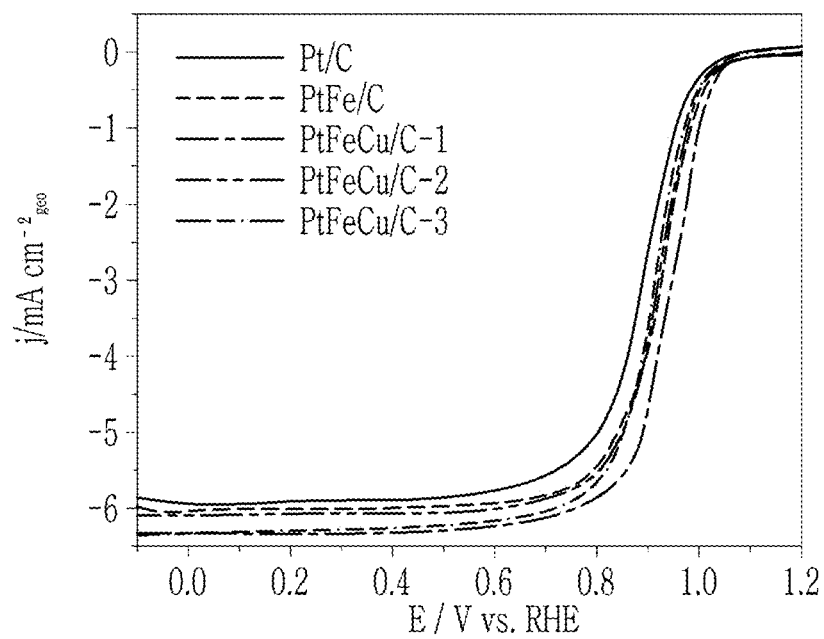

Experimental Example 2: Performance and Durability Analysis of Ternary Alloy Catalyst The binary alloy catalyst of Reference Example 1 (PtFe/C) and the ternary alloy catalysts of Examples 1 to 3 (PtFeCu/C-1 to PtFeCu/C-3) were respectively used to manufacture half-cells, and then, performances of the half-cells were measured, and the results are shown in FIGS. 5 and 6 and summarized in Table 2. As a reference, a commercially available Pt/C catalyst was used.

TABLE 2

| | Composition | ECSA ($m^2$/gpt) | js @ 0.9 V (uA/$cm^2$) | jm @ 0.9 V (A/$mg_{Pt}$) | $E_{1/2}$ (V) |
|---|---|---|---|---|---|
| ref | Pt/C | 84.1 | 248.3 | 0.21 | 886 |
| Reference Example 1 | PtFe/C | 93.0 | 350.8 | 0.33 | 905 |
| Example 1 | PtFeCu/C-1 | 81.3 | 808.8 | 0.66 | 922 |
| Example 2 | PtFeCu/C-2 | 64.0 | 513.6 | 0.33 | 913 |
| Example 3 | PtFeCu/C-3 | 68.2 | 491.9 | 0.34 | 902 |

The PtFe/C binary alloy catalyst (0.33 A/$mg_{Pt}$) had about 1.5 times improved catalyst performance, compared with that of the commercially available Pt/C catalyst (0.21 A/$mg_{Pt}$), and the PtFeCu/C-1 ternary alloy catalyst (0.66 A/$mg_{Pt}$) prepared by adding a small amount of Cu exhibited about twice improved performance, compared with that of the PtFe/C binary alloy catalyst (0.33 A/$mg_{Pt}$), and as Cu was added in a more amount, durability performance was more secured, but the catalyst performance gradually decreased.

Figure 7:
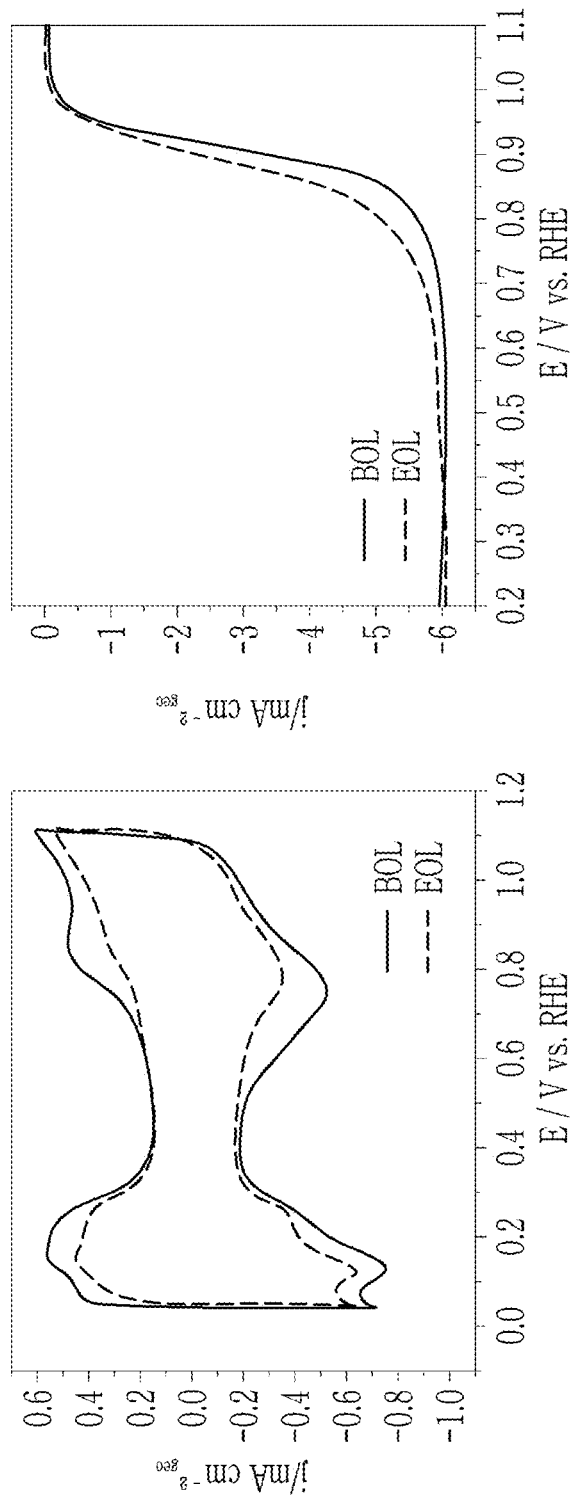
FIGS. 7 to 10 are graphs showing results of measuring durability of the binary alloy catalysts prepared in Reference Example 1 and Example 1 to Example 3, respectively.
Figure 10:
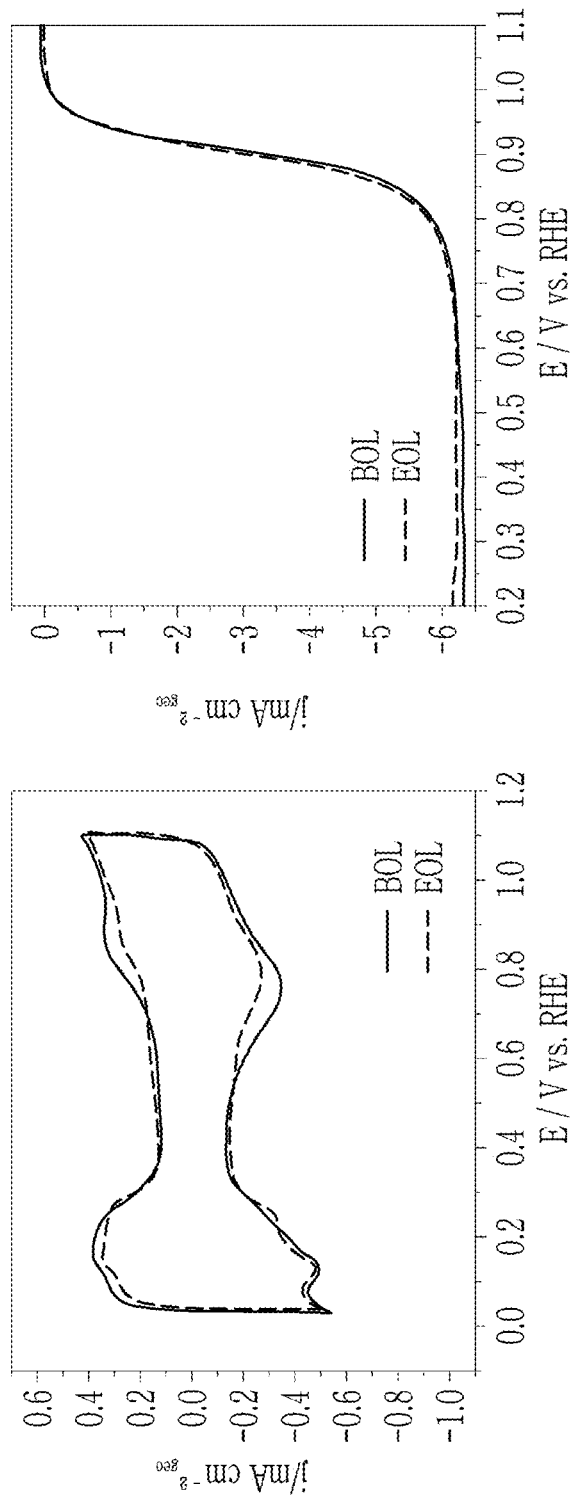

In addition, the ternary alloy catalysts of Reference Example 1 (PtFe/C), and Examples 1 to 3 (PtFeCu/C-1 to PtFeCu/C-3) were manufactured into half-cells, and then, durability of the half-cells was measured (DOE catalyst AST condition), and the results are respectively shown in FIGS. 7 and 10. In particular, the durability was evaluated by comparing electrochemical active surface areas (ΔECSA) and half-wave potential (ΔE½) changes.

Figure 8:
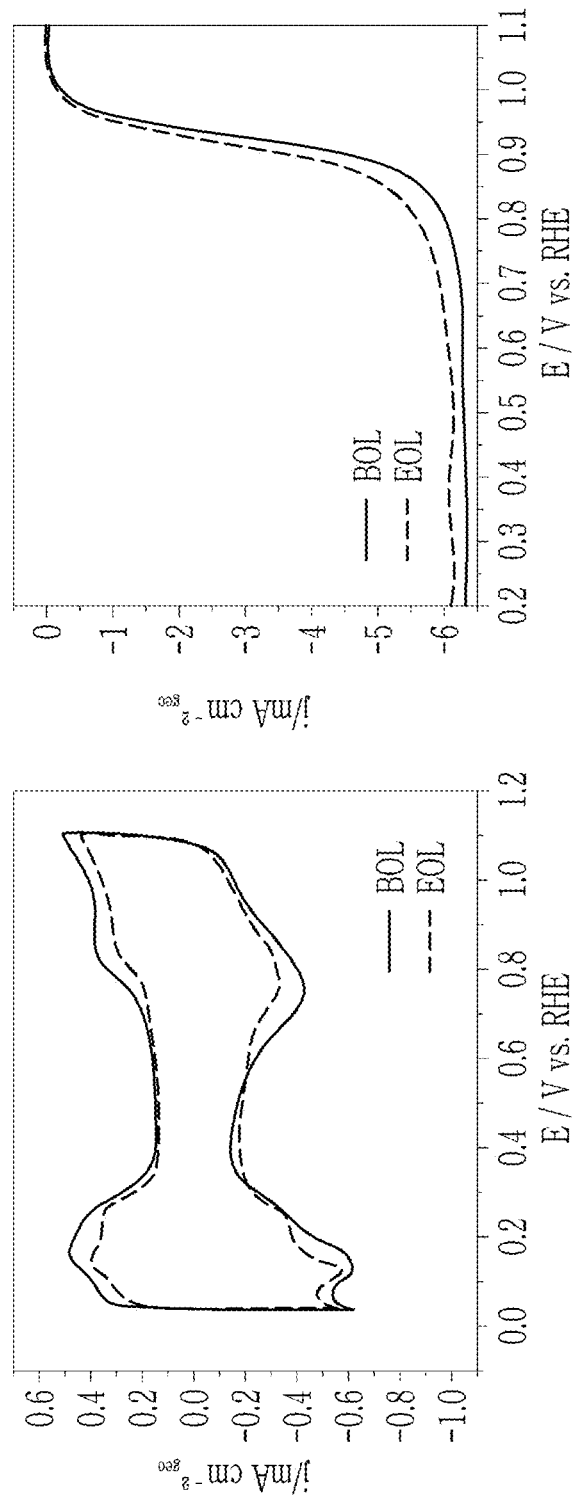
Figure 9:
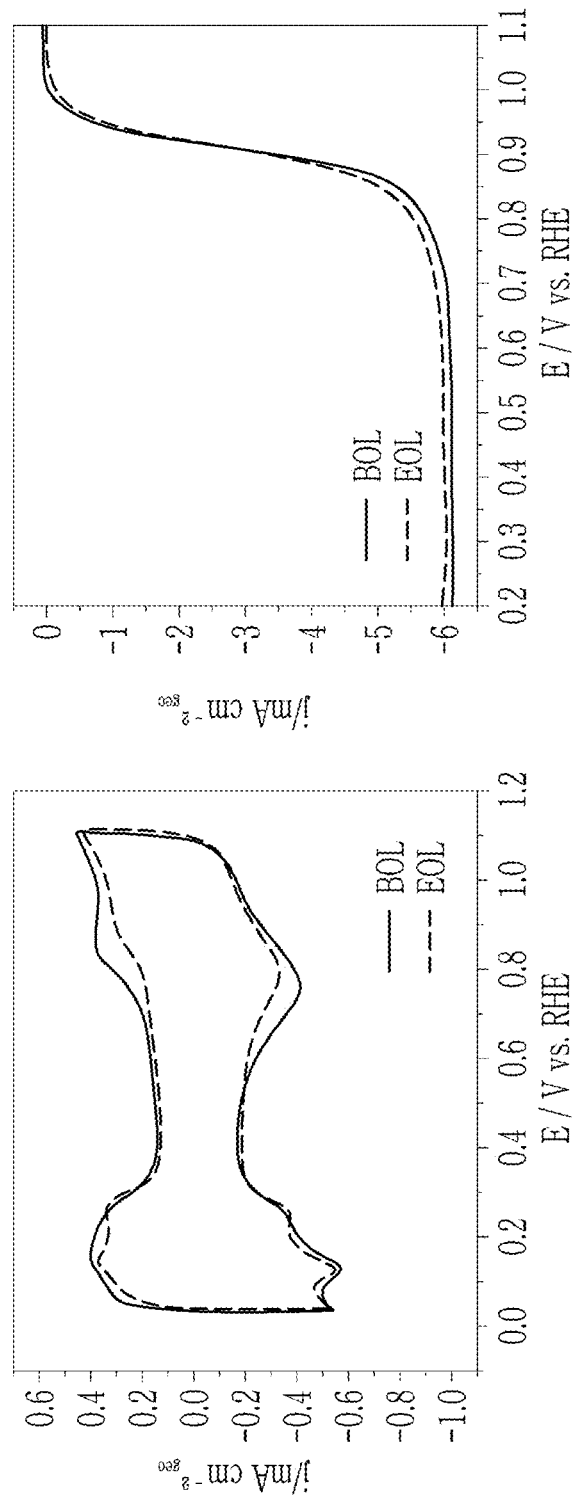

FIG. 7 is a graph showing the results of measuring the durability of the binary alloy catalyst prepared in Reference Example 1 (PtFe/C), FIG. 8 is a graph showing the durability of the ternary alloy catalyst prepared in Example 1 (PtFeCu/C-1), FIG. 9 is a graph showing the results of measuring the durability of the ternary alloy catalyst prepared in Example 2 (PtFeCu/C-2), and FIG. 10 is a graph showing the results of measuring the durability of the ternary alloy catalyst prepared in Example 3 (PtFeCu/C-3).

As shown in FIGS. 7 and 10, the PtFeCu/C ternary alloy catalyst prepared by adding Cu exhibited smaller ΔECSA and ΔE½ than those of the PtFe/C binary alloy catalyst. In other words, durability performance of the alloy catalyst was greatly improved by adding Cu.

While this invention has been described in connection with what is presently considered to be preferred exemplary embodiments, it is to be understood that the invention is not limited to the disclosed embodiments, but, on the contrary, is intended to cover various modifications and equivalent arrangements included within the spirit and scope greater than or equal to appended claims.

DESCRIPTION OF SYMBOLS

10: precursor admixture
20: core-shell particle
30: ternary alloy catalyst
110: transition metal core
120: noble metal shell
130: alloy particle
150: transition metal oxide coating layer
210: alloy core
220: noble metal shell

What is claimed is:

1. A method of preparing a ternary alloy catalyst, comprising:
   treating a precursor admixture comprising a precursor of a noble metal, a precursor of a first transition metal and a precursor of a second transition metal,
   wherein the precursor of the second transition metal is an acetate-based precursor,
   wherein the precursor admixture is treated with ultrasonic waves, and
   wherein the treating with the ultrasonic waves is performed for about 2 hours to about 6 hours at an output of about 100 W to about 300 W based on 100 mL of the precursor admixture.

2. The method of claim 1 wherein the precursor admixture comprises a carrier.

3. The method of claim 1, wherein the noble metal comprises one or more selected from the group consisting of platinum (Pt), ruthenium (Ru), osmium (Os), iridium (Ir), palladium (Pd), and an alloy thereof.

4. The method of claim 1, wherein the precursor of the noble metal comprises one or more selected from the group consisting of a nitrate, a sulfate, an acetate, a chloride, an oxide, and an acetylacetonate of the noble metal.

5. The method of claim 1, wherein the first transition metal and the second transition metal are different transition metals.

6. The method of claim 1, wherein the first transition metal or the second transition metal comprises one or more selected from the group consisting of cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), lanthanum (La), and an alloy thereof.

7. The method of claim 1, wherein the precursor of the first transition metal comprises one or more selected from the group consisting of a nitrate, a sulfate, an acetate, a chloride, an oxide, and an acetylacetonate of the first transition metal.

8. The method of claim 2, wherein the carrier comprises one or more selected from the group consisting of carbon black, graphite, carbon nanofiber, graphitized carbon nanofiber, carbon nanotube, carbon nanohorn, and carbon nanowire.

9. The method of claim 1, wherein in the treating with ultrasonic waves, core-shell particles comprising a transition metal oxide coating layer is formed, and
   wherein the transition metal oxide coating layer is formed on the core-shell particles, and
   wherein the transition metal oxide includes an oxide of the first transition metal and an oxide of the second transition metal.

10. The method of claim 9, wherein the core-shell particles comprise:
    a transition metal core comprising the first transition metal and the second transition metal,
    a shell surrounding the transition metal core and comprising the noble metal, and
    the transition metal oxide coating layer surrounding the shell and including the oxide of the first transition metal and the oxide of the second transition metal.

11. The method of claim 9, wherein a thickness of the transition metal oxide coating layer is about 0.2 nm to about 0.88 nm.

12. The method of claim 9, further comprising:
    annealing the core-shell particles to form alloy particles comprising the transition metal oxide coating layer, and
    removing the transition metal oxide coating layer from the alloy particles.

13. The method of claim 12, wherein each of the alloy particles comprises:
    an alloy core comprising an alloy of the first transition metal and the second transition metal, and
    a noble metal skin layer surrounding the alloy core and including the noble metal.

14. The method of claim 12, wherein the annealing is performed at a temperature of about 200° C. to about 400° C. for about 0.5 hours to about 16 hours.

15. The method of claim 12, wherein the removing of the transition metal oxide coating layer from the alloy particles is performed by acid treatment.

* * * * *